United States Patent
Kraemer et al.

(10) Patent No.: US 8,334,011 B1
(45) Date of Patent: Dec. 18, 2012

(54) METHOD FOR REGENERATING OXIDE COATINGS ON GAS TURBINE COMPONENTS BY ADDITION OF OXYGEN INTO SEGR SYSTEM

(75) Inventors: Gilbert Otto Kraemer, Greenville, SC (US); Ilya Aleksandrovich Slobodyanskiy, Greenville, SC (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 13/209,591

(22) Filed: Aug. 15, 2011

(51) Int. Cl.
| | |
|---|---|
| C23C 16/52 | (2006.01) |
| C23C 14/54 | (2006.01) |
| B05D 3/00 | (2006.01) |
| B05D 7/22 | (2006.01) |
| B05C 13/00 | (2006.01) |
| B41N 1/24 | (2006.01) |

(52) U.S. Cl. ............... 427/142; 427/8; 427/9; 427/140; 427/230; 427/239

(58) Field of Classification Search .............. 427/8, 9, 427/140, 142, 230, 237, 239, 250, 255.11, 427/255.19
See application file for complete search history.

(56) References Cited

U.S. PATENT DOCUMENTS

| | | |
|---|---|---|
| 4,328,285 A | 5/1982 | Siemers et al. |
| 4,457,948 A | 7/1984 | Ruckle et al. |
| 4,675,089 A | 6/1987 | Lory et al. |
| 4,880,614 A | 11/1989 | Strangman et al. |
| 5,015,502 A | 5/1991 | Strangman et al. |
| 5,238,752 A | 8/1993 | Duderstadt et al. |
| 5,498,484 A | 3/1996 | Duderstadt |
| 5,843,585 A | 12/1998 | Alperine et al. |
| 5,902,638 A | 5/1999 | Vakil |
| 6,103,386 A | 8/2000 | Raybould et al. |
| 6,203,927 B1 | 3/2001 | Subramanian et al. |
| 6,495,271 B1 | 12/2002 | Vakil |
| 2009/0038935 A1 * | 2/2009 | Floyd et al. ............. 204/192.11 |

FOREIGN PATENT DOCUMENTS

EP  1 944 387  7/2008

* cited by examiner

*Primary Examiner* — Michael Cleveland
*Assistant Examiner* — Michael Wieczorek
(74) *Attorney, Agent, or Firm* — Nixon & Vanderhye P.C.

(57) ABSTRACT

A method for regenerating oxide coatings on selected gas turbine engine components in situ, comprising the steps of defining an exhaust gas recirculation (EGR) loop for the gas turbine engine, identifying one or more target locations within the EGR loop for purposes of monitoring the level of metal oxide degradation occurring in key gas turbine engine components over time, collecting and analyzing data corresponding to the level of metal oxide degradation with a fixed time period at each of the target locations, determining which ones of the target locations within the EGR loop require oxide regeneration using injected oxygen, and controlling the amount of oxygen injection at the target locations sufficient to regenerate the metal oxide coatings to desired levels.

11 Claims, 3 Drawing Sheets

METHOD FOR REGENERATING OXIDE COATINGS ON GAS TURBINE COMPONENTS BY ADDITION OF OXYGEN INTO SEGR SYSTEM

The present invention relates to a method that can be implemented in situ to regenerate metal oxide coatings on gas turbine engine components (including both the base metal substrates and metal oxide coatings) without shutting the gas turbine engine down in order to accomplish the desired coating regeneration.

BACKGROUND OF THE INVENTION

Gas turbine engines typically include a compressor section, a combustion section and a turbine section. The compressor section pressurizes ambient air that discharges at high pressure into a combustion section, typically comprising a plurality of combustors positioned in an annular array about the axis of the gas turbine engine. The pressurized air flows into the combustor fuel nozzles through one or more openings in the nozzles and mixes with a fuel source. The fuel/air mixture is injected into and burned in the combustion chamber of each combustor and the hot gasses of combustion flow from the combustion section to the turbine section where energy is extracted from the gasses to drive the turbine and generate electric power.

In certain gas turbine applications, such as oxy-fuel or stoichiometric exhaust gas recirculation ("SEGR") systems, the compressor discharge typically includes an oxygen-deficient gas because such systems, particularly SEGR, are designed to minimize the amount of excess oxygen present in order to maintain an acceptable level of combustion efficiency. Normally, any excess oxygen in SEGR systems eventually must be removed from the working fluid in order to ensure optimum engine performance and efficiency.

One area of concern with SEGR systems is that the low levels of oxygen present at certain locations within the SEGR loop can cause the metal oxide coatings used on critical engine components to deteriorate over time by reverting to a non-oxidized form of the coatings. Such metal oxide coatings normally fall into three basic categories: (1) corrosion-resistant coatings; (2) oxidation-resistant coatings; and (3) thermal barrier coatings ("TBC"), as well as combinations thereof. The deterioration of the oxide coatings over time can result in a potential loss of their protective and structural attributes and damage to one or more key component parts.

In recent years, the potential for oxide degeneration of components in gas turbine engines, particularly SEGR systems, has become greater due to the higher operating temperatures used to improve engine efficiency over long periods of operation. As the operating temperatures increase, the durability of the components of the engine at elevated temperatures must correspondingly increase. While significant advances in metallurgy in high temperature applications have been made using, for example, nickel and cobalt-base superalloys, the use of alloys alone often is not adequate to protect turbine components in certain critical operating sections of a gas turbine engine that are vulnerable to oxide degradation over time. One past solution has been to thermally insulate critical components (e.g., the turbine blades) to reduce the effective service temperature of the metal substrate. For example, thermal barrier coatings ("TBC") can be applied over the metal substrate of certain components to improve their long term reliability and typically comprise a metal oxide layer placed over the base metal substrate using a bond coat applied by known thermal spray techniques such as physical vapor deposition.

Although significant advances have been made in improving the durability of TBC, oxidation-resistant and corrosion-resistant coatings, such techniques invariably require removal and repair of the deteriorated metal components after extended periods of use. The physical removal of protective coatings and the repair of underlying metal substrates can be very time consuming and even result in a loss of the underlying metal substrate in order to undertake the repairs. The potential removal of the underlying metal substrate is particularly acute with diffusion coatings and bond coat layers since the coatings/layers often extend over time into the metal substrate surface. As noted above, repeated conventional repair/recoat processes can result in significant material losses that eventually cause the component to be under minimum tolerable wall thicknesses and thereby vulnerable to catastrophic failure.

Various methods have also been used in the past in an effort to protect the underlying base metal components in new gas turbines. Significantly, however, the known methods invariably require that the protective coatings be applied to specific components before the engine is placed into operation (or perhaps later during a shutdown repair mode). Thus, such methods cannot be used to accomplish an in situ repair while the system is up and running. In the past, various protective coatings have been applied to select engine components using conventional plasma spray techniques before the engine becomes operable. Other processes improve the surface prophylaxis of specific components against fouling by contacting the surfaces with a metal compound that converts into a metal oxide during a subsequent heat treatment.

Again, these known methods do not teach or suggest a technique for regenerating the metal oxide coatings in situ while the engine remains in full operation, particularly gas turbine engines that utilize SEGR and run with low oxygen concentrations in the working fluid in order to achieve acceptable operating efficiencies. For example, a level of 1% oxygen by volume is normally considered the maximum level that most SEGR systems can tolerate without sacrificing efficiency. In the past, the prospect of injecting additional air or oxygen into an SEGR loop to improve the integrity or projected life of the underlying oxide layers was considered detrimental to the overall engine operation and counter-intuitive because of the predicted engine efficiency losses. Although oxygen levels at 1% or lower in an SEGR loop help to maintain desired engine efficiency levels, over long periods of time the low level of oxygen tends to cause the oxide coatings of key SEGR components to become reduction targets resulting in an eventual loss of metal integrity and strength. Eventually, the entire engine must be taken out of service in order to repair and/or refurbish those components.

Thus, a significant need still exists in the art for an improved process to repair gas engine turbine components during operation, particularly those involving SEGR, in order to minimize the loss of the underlying metal substrate and/or to regenerate the base oxide coatings. A need also exists to preserve the existing metal oxide coatings and substrates, particularly in SEGR systems, without undertaking costly repairs and the inevitable downtime of refurbishing selected metal components which require taking the entire gas turbine engine out of service for an extended period of time. The oxidation reactions regenerating the oxide coatings is more rapid at the higher metal temperatures during operation reducing the regeneration time.

The general categories of articles that can be treated as described herein include those comprising a base metal substrate having a first material containing one or more metal oxides and a layer of second material overlying at least a portion of the metal substrate. The second material normally will be similar in composition to the first material with the base substrate and layer being integrally bonded at their interface. Often, the second layer to be regenerated comprises material from a deposition process such as vapor phase deposition, ion plasma deposition, cathodic arc deposition sputtering techniques or combinations thereof.

BRIEF DESCRIPTION OF THE INVENTION

One aspect of the invention provides a new method for regenerating oxide coatings in situ on selected gas turbine engine components, comprising the steps of first defining an exhaust gas recirculation (EGR) loop for the gas turbine engine, identifying one or more target locations within the EGR loop for purposes of monitoring the level of metal oxide degradation occurring in the selected gas turbine engine components over time, collecting and analyzing data corresponding to the level of metal oxide degradation within a fixed time period at each of the target locations, determining which ones of the target locations within the EGR loop require oxide regeneration using injected oxygen and/or air, and controlling the amount of oxygen injection at the target locations sufficient to regenerate the metal oxide coatings.

Another aspect of the invention provides a system for regenerating the oxide components on selected engine components using a feedback control system to accurately monitor the level of degradation over time and thereafter controlling the oxide regeneration using the exemplary method.

Thus, at least one aspect of the invention provides for the introduction of oxygen at selected times, temperatures and physical locations within the exhaust gas recirculation loop in order to regenerate the metal oxide coatings, in addition to the base metal components themselves.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
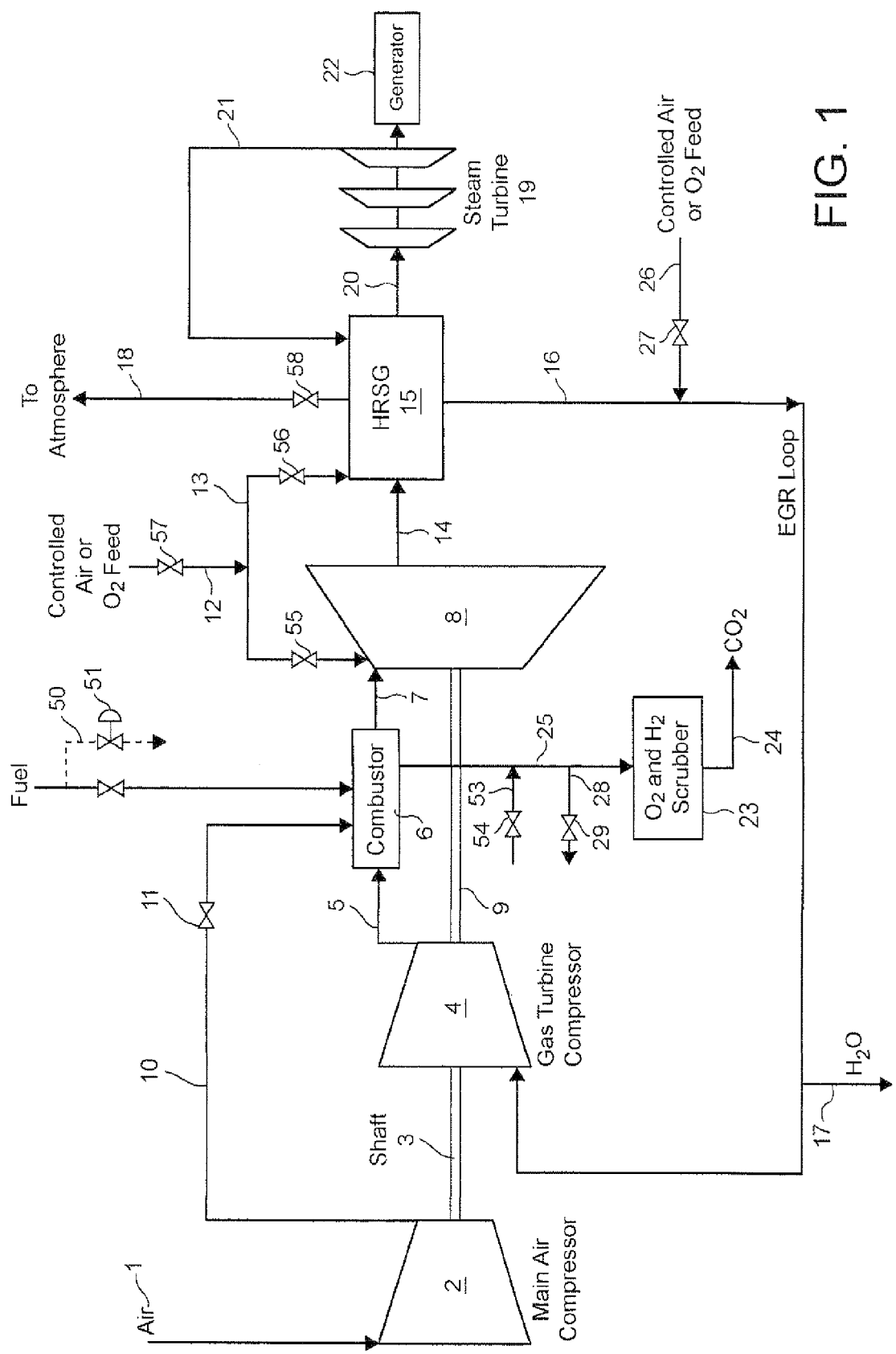
FIG. 1 is a process flow diagram of an exemplary gas turbine engine system illustrating the basic components and process for carrying out the method according to the invention to achieve in situ regeneration of metal oxide coatings on selected components in an exhaust gas recirculation ("EGR") loop.

As indicated above, gas turbine systems using EGR or SEGR necessarily require (for thermal efficiency reasons) a low oxygen atmosphere in the gas turbine, e.g., preferably less than 1% by volume. Some SEGR systems even require oxygen levels as low as 10 ppm, depending on the desired engine operating characteristics and application. One concern of SEGR processes is that the low oxygen levels which serve to improve the thermal and stoichiometric efficiency of gas turbine systems also cause the existing metal oxide coatings to become degraded over time because the low oxygen atmosphere of the working fluid eventually tends to strip oxygen from the oxide layers, i.e., as carbon monoxide in the working fluid reacts to form carbon dioxide. Even the base metallurgy of the gas turbine components can be adversely affected and suffer from such "oxidative corrosion" over long periods of operation with a high temperature working fluid. Carbon content of the metal substrates could be altered in the low oxygen atmosphere without periodic addition of oxygen at higher concentrations too. Because SEGR systems are not designed to use high oxygen levels, any unreacted, recirculated oxygen eventually should be removed using a catalyst that transforms CO into $CO_2$, with the CO acting as a reducing agent in the conversion reaction.

The present invention accomplishes the need to regenerate metal oxide layers in the gas turbine engine by incrementally adding oxygen while the engine is still operating without adversely affecting the in-place catalyst systems designed to remove excess oxygen above certain threshold levels. Significantly, the selected injection of oxygen at specific times and locations does not result in a significant loss of efficiency of the engine or the catalyst treatment operations already in place, although the load on the catalyst treatment operation may incrementally increase during the intervals in which oxygen is being added to achieve the desired level of metal oxide regeneration.

As also discussed below in connection with FIGS. 1-3, the temporary, periodic injection of a higher oxygen content gas or fluid into the SEGR gas system (using air, hydrogen peroxide or even pure oxygen) can be made at one or more target locations inside the "closed" recirculation loop for different periods of time and at different operating temperatures and pressures, depending on the specific metallurgical conditions encountered and predicted levels of degradation of those target components. It has been found that virtually all of the metal oxide coated components in the "low oxygen loop" in the SEGR system (which include at least the EGR and HRSG) are prime candidates for improving the oxide level in the coatings and base metallurgy using the invention. The controlled addition of oxygen preferably can be made at near ambient pressure locations in the SEGR loop order to minimize the need to pressurize the oxygen injections (and hence reduce cost).

It has been found that the time period for exposure to the additional oxygen (via air, $O_2$ or hydrogen peroxide) is on the order of about ½ hour to two hours, depending upon the exact location of injection, oxygen concentration, time between regenerations, operational history, temperature environment, metallurgical target, etc. since some metal oxide coatings regenerate at different rates over time, depending on their base composition, operating temperature, pressure and working fluid conditions.

In other aspects of the invention, an exemplary control system includes the use of test coupons (referred to in connection with the figures as "degradation simulators") located at strategic points in the exhaust gas recirculation loop to determine and monitor the level of oxide degradation and resulting level of improvement to the coatings following introduction of oxygen in the manner described below.

Referring to the drawings, wherein identical reference numerals denote the same elements throughout the various views, FIG. 1 is an exemplary process flow diagram for a gas turbine engine system illustrating the basic hardware components and process steps used to achieve in situ regeneration of metal oxide coatings according to the invention, particularly as applied to selected components in an exhaust gas recirculation ("EGR") loop. Controlled air feed 1 passes into a main air compressor ("MAC") 2 and exists at elevated pressure from the last stage as shown by compressor discharge line 5 into gas turbine combustor 6. The MAC and gas turbine compressor are operatively connected via rotating shaft 3. In like manner, gas turbine compressor 4 operates to drive gas turbine 8 via rotating shaft 9. The higher pressure air stream leaving MAC 2 feeds directly into combustor 6 via combustor air feed 10 through control valve 11 as shown. A controlled amount of hydrocarbon fuel (such as natural gas labeled "Fuel" in FIG. 1) feeds directly into the gas turbine combustor where it ignites and produces thermal energy. The spent exhaust gasses 7 exiting from the combustor drive gas turbine 8 and thereafter pass at a lower pressure as shown at 14 into heat recovery steam generator 15.

The exhaust gas recirculation ("EGR") loop 16 recycles feed back to gas turbine compressor 4. The exhaust stream 20 from the HRSG 15 is then used to drive steam turbine 19 as shown to generate electrical power via generator 22 in a conventional manner. Typically, a portion of the spent exhaust from HRSG 15 will be removed from the HRSG through valve 58 and vented to the atmosphere as shown through line 18. In order to increase the operating efficiency of the steam turbine, the spent exhaust gasses exiting the last stage of steam turbine 19 are recycled back to the HRSG via recycle line 21.

FIG. 1 also illustrates how the gas turbine exhaust is normally treated to remove as much residual carbon monoxide and oxygen as possible in order to improve engine efficiency. That is, because the combustion step is not stoichiometrically perfect, a residual amount of unburned oxygen and CO must be treated in a separate operation. Here, a portion of the combustor exhaust stream 25 passes through an oxygen and hydrogen scrubber 23 which removes CO and consumes unburned free oxygen to form carbon dioxide stream 24. Alternatively, the CO scrubbing operation may comprise a catalyst bed that converts CO to carbon dioxide and consumes oxygen in an exothermic reaction. The gas turbine exhaust passes through the HSRG which uses the intrinsic heat value of the exhaust gas to generate steam and extract energy using the steam turbine as noted above.

The flow pattern depicted in FIG. 1 indicates that the level of oxygen leaving the combustor typically falls below about 1% by volume, and preferably ranges between of about 0.3% to 0.01% in order to ensure that the SEGR operates effectively and remains on target to meet overall thermal efficiency goals. On the other hand, because additional oxygen is being added at periodic intervals during the oxide regeneration cycle, the system necessarily must run slightly above stoichiometric for a given short period of time. In the embodiment of FIG. 1, the level of oxygen in the system will be continuously monitored to ensure that it remains at or below about 1% by volume, and preferably within the range of about 0.5% to 1.0% until the regeneration cycle is complete.

The means for periodically adding a controlled amount of oxygen to the EGR loop according to the invention is shown by way of example in FIG. 1 as occurring at two different target locations, namely through air/oxygen feed line 12 that injects a prescribed amount of air and oxygen into an early stage of the steam turbine through valve 55 and/or directly into the HRSG through HRSG feed line 13 using control valve 56. Alternatively, additional oxygen and air may be fed into the EGR loop downstream of the HRSG as shown through EGR air/$O_2$ feed line 26 using feed valve 27. The EGR loop also can be potentially supplied with ambient air using, for example, a damper door (not shown) with an ejector style inlet (e.g., a pipe pointing downstream in the EGR loop) to assist in drawing in ambient air to regenerate the coating during prescribed time intervals.

FIG. 1 also shows the potential addition of carbon monoxide (or even hydrogen) during a regeneration cycle in order to more precisely control the oxygen level in the feed to $O_2$ and $H_2$ catalytic scrubber 23 (preferably less than 10 ppm by volume oxygen at the scrubber exit), using combined feed line 53 and valve 54. As another control, line 28 and related shutoff valve 29 allow for a fraction of the feed 25 to bleed into the atmosphere to help cool the combustor (rather than using vent line 18) and/or to control the feed to oxygen and hydrogen scrubber 23. It may even be desirable to bypass a certain amount of the hydrocarbon fuel in the "Fuel" feed to the combustor (see auxiliary fuel line 50 and feed control valve 51 shown in dotted line format) during the regeneration cycle, again depending on the amount of carbon monoxide and oxygen removed by the oxidation catalyst in scrubber 23.

Normally, an oxide regeneration cycle occurs using the 1:2 ratio of CO and oxygen as a basic control parameter in order to ensure that the catalytic reduction of CO to carbon monoxide remains high but does not overload the catalyst system. Other reducing agents (such as ethane) can be added in order to ensure that the CO level drops to prescribed levels before, during and after the oxide regeneration cycle is complete. Another control factor in determining the proper level of oxygen addition during regeneration relates to the performance criteria of 3-way catalysts used to remove NOX components (which typically cannot exceed about 4% oxygen without losing their effectiveness in removing NOX).

Typical regeneration cycles according to one aspect of the invention add free oxygen in one form or another and run for approximately 30 minutes up to about 2 hours, depending on system operating conditions prior to regeneration. The regeneration should occur periodically (perhaps as often as every week), depending on periodic, monitored metal oxide levels in the EGR as described in more detail below.

Figure 2:
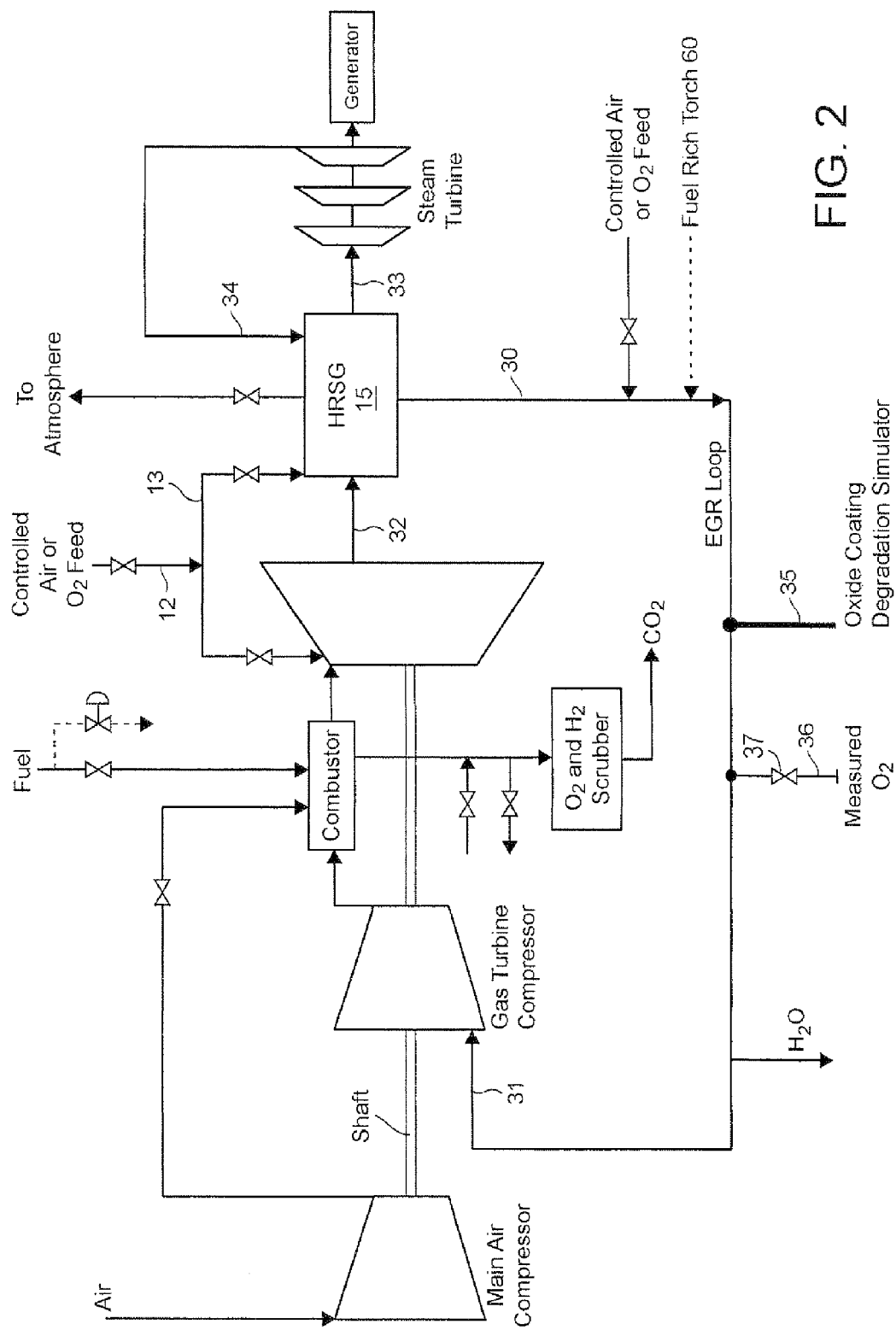
FIG. 2 is a process flow diagram of an exemplary system according to the invention illustrating specific target positions for injecting oxygen into the EGR loop for the purpose of regenerating the metal oxide coatings on selected gas turbine engine components.

FIG. 2 illustrates various exemplary target locations within the EGR loop depicted in FIG. 1 which can be used to first monitor metal oxide degradation and then initiate, control and terminate the oxygen addition. As indicated in FIG. 1, various additional air and/or oxygen feed points can be provided in order to regenerate selected metal oxide components in situ, i.e., without shutting down the gas turbine engine itself, thereby increasing the overall efficiency of the engine over time. FIG. 2 illustrates an exemplary system for introducing the oxygen at selected times, temperatures and physical locations within the EGR loop in order to regenerate the oxide components.

For example, one or more of the oxide degradation simulators positioned in the EGR loop will receive periodic injections of air and/or oxygen, including the feed amount and duration as shown through oxygen feed line 36 and valve 37. After one or more oxygen injections are completed at prescribed locations, times and durations, subsequent data from those same oxide degradation simulators can be used to update the oxygen feed amounts, locations and durations until the regeneration cycle is complete (or at least reaches predicted oxide regeneration levels). Oxide coating degradation simulator 35 may include, for example, a metal oxide coating applied to a coupon having a known surface conductivity integrated to determine the precise loss oxide over time. Alternatively, the simulator could comprise a thermal sensor operating in the nature of a hot wire anometer. A thermistor bead like device might also be used to provide the required oxide degradation data.

FIG. 2 also shows the potential use of a fuel rich torch 60 at one or more strategic locations as the means for adding carbon monoxide directly into the system, with the CC then being available to remove any residual oxygen left by a reaction to form $CO_2$, i.e., based on the following reaction:

$$Ch_4 + O_2 \rightarrow 0.5CO + 0.5CO_2 + H_2 + H_7O.$$

In operation, a single regeneration cycle can be performed in cooperation with other parts of a larger system, e.g., with only one gas turbine engine undergoing regeneration at a particular time. Thus, the type of control loop depicted in FIG. 2 can be designed to interface with the control loop for an entire plant comprised of multiple gas turbine engines. In that sense, an exemplary system would be experienced-based using multiple inputs of oxide regeneration data accumulated for different engines over time, again with the objective of allowing regeneration of selected EGR components to occur without shutting down any one gas turbine engine.

Figure 3:
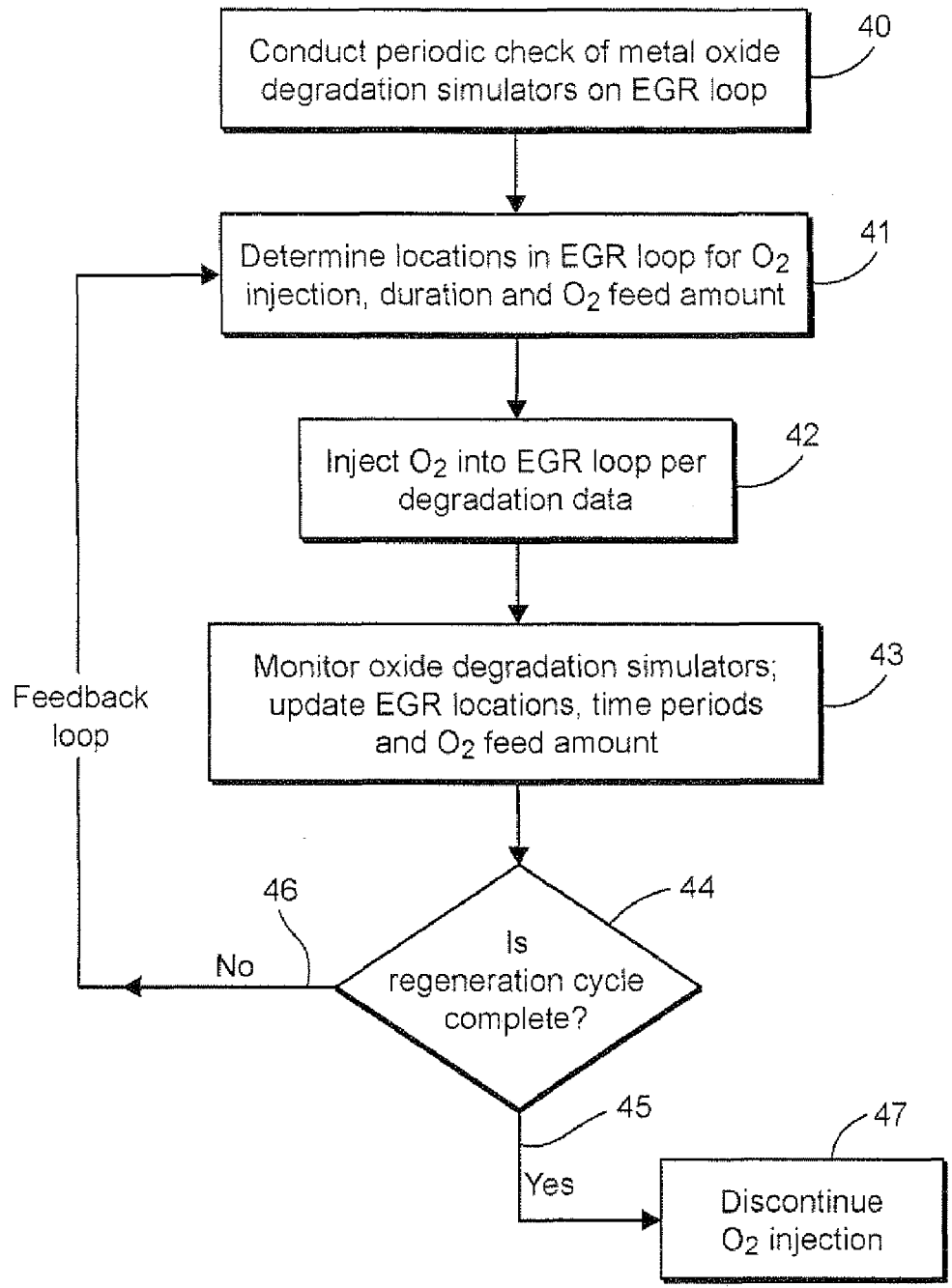
FIG. 3 is a decisional flow chart showing the exemplary steps according to the invention.

FIG. 3 of the drawings depicts a decisional flow chart showing the exemplary steps undertaken to monitor and thereafter regenerate a metal oxide component in a gas turbine engine according to the invention. As illustrated in FIG. 2, an exemplary method according to the invention begins with step 40 which involves periodic checks of the metal oxide degradation simulators positioned at various strategic locations in the EGR loop. The data from the degradation simulators is continuously analyzed using a computer program capable of comparing the accumulated degradation data over time with target parameters and algorithms based on past accumulated empirical data. The input data at step 41 is used to determine specific target locations in the EGR loop for oxygen injection to take place, as well as the duration of injection and precise oxygen feed rate over time to achieve the required level of oxide regeneration. The actual oxygen injections take place at step 42 based on the EGR data accumulated and analyzed over time.

Following oxygen injection, data from the degradation simulators is continuously monitored to determine the effect of the injection. The resulting new degradation data is then used in step 43 to upgrade the specific EGR locations that still require a prescribed amount of oxygen feed, with corresponding new injection feed rates and time periods being determined based on updated computer program outputs. At step 44, a determination is made based on a comparison of accumulated data during the regeneration cycle with target regeneration values as to whether the target values have reached acceptable tolerance levels. If the cycle is complete (see step 45), oxygen injection is discontinued as shown at 47. Otherwise, the feedback loop at 46 sends instructions to continue the injection and the oxide monitoring and regeneration process continues as shown.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for regenerating metal oxide coatings on gas turbine engine components, comprising:
    (a) Defining an exhaust gas recirculation (EGR) loop for said gas turbine engine;
    (b) Identifying one or more target locations within said EGR loop for monitoring the level of metal oxide degradation over time;
    (c) Collecting and analyzing data corresponding to said level of metal oxide degradation over time at said target locations;
    (d) Determining specific ones of said target locations for injection of oxygen into said EGR loop; and
    (e) Determining the amount of oxygen injection at said specific ones of said target locations sufficient to regenerate said metal oxide coatings to achieve a defined oxide level;
    (f) Injecting the determined amount of oxygen at said specific locations to regenerate said metal oxide coatings.

2. A method according to claim 1, further comprising the step of continuously monitoring the amount of oxide regeneration occurring over time at said target locations in said EGR loop.

3. A method according to claim 1, wherein said step of determining the amount of oxygen injection corresponds to individual ones of said target locations.

4. A method according to claim 1, wherein, steps (a) through (f) are carried out in situ without shutting down said gas turbine engine.

5. A method according to claim 1, further comprising the step of feeding back data regarding the level of said oxide regeneration in order to control the amount of said oxygen injection over time at said target locations.

6. A method according to claim 1, wherein said gas turbine engine comprises a gas turbine compressor, a combustor, a gas turbine driven by the exhaust from said combustor, an oxygen and hydrogen scrubber and a heat recovery steam generator ("HRSG").

7. A method according to claim 6, wherein said step of injecting oxygen occurs as part of the feed to said heat recovery steam generator in said EGR loop.

8. A method according to claim 6, wherein said step of injecting oxygen occurs as part of the feed to said gas turbine.

9. A method according to claim 6, wherein said step of injecting oxygen occurs downstream of said heat recovery steam generator in said EGR loop.

10. A method according to claim 6, wherein said step of collecting and analyzing data corresponding to said level of metal oxide degradation takes place in said EGR loop downstream of said heat recovery steam generator.

11. A method according to claim 6, further comprising the step of controlling the hydrocarbon fuel feed and oxygen feed to said combustor during said oxide regeneration.

* * * * *

UNITED STATES PATENT AND TRADEMARK OFFICE
CERTIFICATE OF CORRECTION

| | | |
|---|---|---|
| PATENT NO. | : 8,334,011 B1 | Page 1 of 1 |
| APPLICATION NO. | : 13/209591 | |
| DATED | : December 18, 2012 | |
| INVENTOR(S) | : Kraemer et al. | |

It is certified that error appears in the above-identified patent and that said Letters Patent is hereby corrected as shown below:

At column 7, line 3, delete "with the CC" and insert --with the CO--

At column 7, lines 6-7, delete "$Ch_4 + O_2 \rightarrow 0.5CO + 0.5CO_2 + H_2 + H_7O.$" and insert --$Ch_4 + O_2 \rightarrow 0.5CO + 0.5CO_2 + H_2 + H_2O.$--

Signed and Sealed this
Twenty-ninth Day of January, 2013

David J. Kappos
*Director of the United States Patent and Trademark Office*